United States Patent [19]
Tyburski et al.

[11] 3,764,978
[45] Oct. 9, 1973

[54] COMBINED MAGNETIC OPTICAL CHARACTER READER

[75] Inventors: Robert M. Tyburski, Fairfax, Va.; Donald W. Russell, Potamac, Md.; Brian D. Mayberry, Alexandria; Joseph R. Kenney, Woodbridge, both of Va.

[73] Assignee: Optical Recognition Systems, Inc., Reston, Va.

[22] Filed: May 2, 1972

[21] Appl. No.: 249,643

[52] U.S. Cl. .................. 340/146.3 D, 340/146.3 Ed, 235/61.11 R, 235/61.7 R
[51] Int. Cl. .............................................. G06k 9/00
[58] Field of Search .............. 340/146.3 D, 146.3 C, 340/146.3 Q, 146.3 ED, 146.3 R, 146.1 BA, 146.1 BE, 174.1 B, 146.3 Z, 146.3 S; 235/61.7 R, 61.7 B, 61.12 M, 61.11 D, 61.11 F, 61.11 E

[56] References Cited

UNITED STATES PATENTS 3,612,835 10/1971 Andrews et al. ............ 235/61.11 D
2,950,971 8/1960 Lewin ........................ 235/61.11 D

FOREIGN PATENTS OR APPLICATIONS 820,283 9/1959 Great Britain .............. 340/146.3 D

*Primary Examiner*—Thomas A. Robinson
*Attorney*—Francis C. Browne et al.

[57] ABSTRACT

A system and method for character recognition in which each of a plurality of characters is recognized both magnetically and optically. If the magnetic reader fails to recognize a character while the optical reader is successful in recognizing it, a character identification signal corresponding to the character recognized by the optical reader is generated while if the optical reader fails to recognize a character and the magnetic reader is successful in recognizing it, an identification signal corresponding to the character recognized by the magnetic reader is generated. Where the magnetic and optical readers provide signals indicative of different characters while attempting to read the same character, depending on the parameters of the system an identification signal corresponding to one or the other recognition signals, or a reject signal is generated.

34 Claims, 6 Drawing Figures

| | 1 | 2 | 3 | 4 | 5 | 6 |
|---|---|---|---|---|---|---|
| MICR | $A_1$ | $A_1$ | R | $A_1$ OR R | b | $A_1$ |
| OCR | $A_1$ | R | $A_1$ | b | $A_1$ OR R | $A_2$ |
| IDENT. | $A_1$ | $A_1$ | $A_1$ | $A_1$ OR R | $A_1$ OR R | $A_1$, $A_2$, R |

COMBINED MAGNETIC OPTICAL CHARACTER READER

This invention relates to a system and method for character recognition.

In recent years electronic character recognition systems have gained increased importance in the commercial world. One problem associated with presently known character recognition systems is that they are not always capable of positively identifying characters. For instance, when a character is misshapen or when a defect appears in a character or the character environment, presently known character recognition systems may not be able to identify the character and will emit a reject signal. Documents including characters which have been rejected are frequently segregated from the remainder of the documents read for subsequent processing.

It is desirable to cause the rate of rejected documents to be as low as possible. This is because the rejected documents must be processed separately and as such represent a substantial additional expense in terms of time and money. For instance, one frequently used procedure is for the rejected documents to be segregated and for an operator who is in visual contact with the documents to manually enter information on the rejected documents to the system.

The character recognition machines of the prior art have used either solely magnetic reading techniques or solely optical reading techniques. It has been found that there are certain types of character defects or character environment defects which cause an optical reader to reject a character while a magnetic reader is capable of correctly identifying the character. Conversely, it has been found that there are certain other character recognition situations in which a reader using magnetic techniques is more likely to produce a reject or an erroneous character indication than a reader using optical techniques. According to the present invention therefore, a method and system for recognizing characters is provided in which characters are read both magnetically and optically and wherein the magnetic reader recognition signal is selected as the character identification signal when the optical reader produces a reject signal and wherein the optical reader recognition signal is utilized as the character identification signal when the magnetic reader results in a reject signal. By therefore providing an identification signal for a character whenever either the optical or magnetic reader can identify a character the system is able to recognize a greater percentage of the characters presented to it than either an optical or magnetic system by itself. The invention thus harnesses the best qualities of magnetic reading and optical reading to provide a recognition system having an extremely low reject rate.

Additionally, a character recognition situation is sometimes encountered where not all of the characters to be recognized are susceptible to either solely optical or solely magnetic techniques. For instance, only some of the characters on a document might be printed in magnetic ink or only some of the characters might be printed in blank ink which is generally the only color ink which will be properly absorbed by the infrared radiation which is sometimes utilized in optical systems. According to the invention, a system having both magnetic and optical recognition capabilities is provided wherein the magnetic reader can read those characters which can be recognized only magnetically and the optical reader can read the characters which can be recognized only optically and thus all of the characters on any document can be read.

Furthermore, there are character recognition situations where a high reject rate can be tolerated but where it is imperative to hold erroneous recognition of characters to an absolute minimum. According to a further aspect of the invention characters are read by both magnetic and optical techniques and are rejected unless the magnetic identification signal and the optical identification signal agree with each other. This is a redundant type of system which results in a somewhat higher reject rate than a magnetic or optical system by itself, but which results in an extremely low erroneous identification rate.

It is therefore an object of the invention to provide a system and method for recognizing characters which results in an extremely low reject rate.

It is a further object of the invention to provide a character recognition system and method which can recognize a group of characters, some of which are susceptible to only magnetic recognition techniques or to only optical recognition techniques.

It is still a further object of the invention to provide a system and method for recognizing characters using a redundant technique which results in an extremely low rate of erroneous character identification.

It is still a further object of the invention to combine both magnetic recognition techniques and optical recognition techniques in a single system.

The invention will be better understood by reference to the detailed description of a preferred embodiment below when taken in conjunction with the drawings in which.

While the preferred embodiment of the invention is described with regard to the recognition of the stylized, magnetically printed characters located at the bottom of bank checks, it is to be understood that the invention relates to character recognition broadly and is not to be limited to the recognition of characters on checks. It should further be understood that while the invention utilizes both a magnetic character reader and an optical character reader the invention does not relate to specific optical or magnetic recognition techniques by themselves and that any optical or magnetic reading technique may be used.

Figure 6:
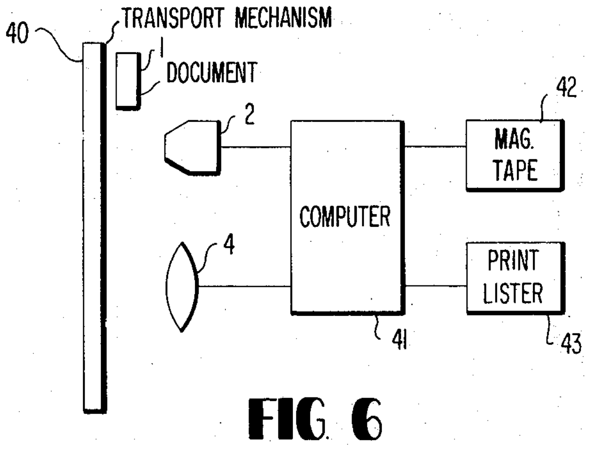
FIG. 6 is a block diagram of an overview of the system of the invention.

An overview of the system according to the invention is shown in FIG. 6. Here document 1 is fed by mechanical transport means 40 past magnetic reading station 2 and optical reading station 4. Signals corresponding to the characters read at the reading stations are inputted to computer 41 which may include recognition logic blocks 3 and 5 and logic blocks 7 to 15 shown in FIG. 1 as well as means for controlling mechanical transport means 40 as is known to those skilled in the art. Magnetic tape unit 42 and print listing unit 43 are connected to the output of computer 41 and are activated by the computer to compile a permanent tape and printed record respectively of the characters recognized by the logic of computer 41.

Figures 1, 2:
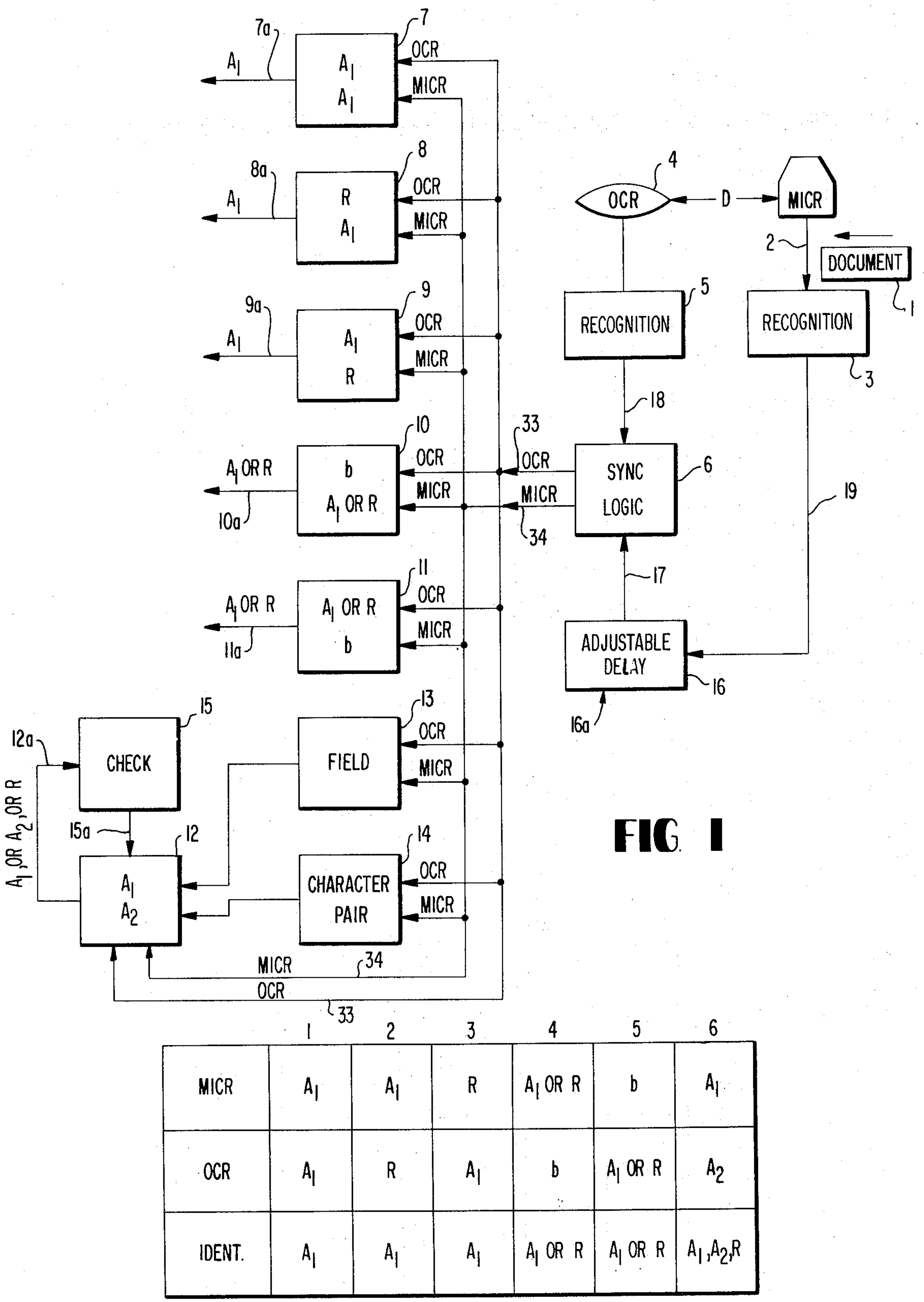
FIG. 1 shows a block diagram of a recognition system according to the invention.
FIG. 2 shows a table which indicates the identification signal resulting from various combinations of magnetic recognition signals and optical recognition signals.

Referring to the system in greater detail in FIG. 1, document 1 which may be a check, as discussed above, is fed by a conventional mechanical transport mechanism through magnetic reading station 2. As discussed above, any type of magnetic reader may be used such as for instance a conventional MICR reading head which responds to the total value of the magnetic flux in the magnetically printed characters passing adjacent thereto. Each character, because of its different shape, causes the magnetic reader to generate a different characteristic electrical waveform which is recognized by logic recognition circuitry 3 which provides a unique coded recognition signal for each character, and a reject signal if the reader is unable to identify the character. The code used may be a four-bit code in which case there would be four lines 19 fed from recognition logic circuitry 3 to adjustable delay circuitry 16. Of course, any code having any number of bits may be used for purposes of illustration, only a single line 19 is illustrated.

Situated a fixed distance D from the magnetic reading station 2 is optical reading station 4. The transport mechanism transports the document 1 at a predetermined speed through reading station 2 and then through reading station 4 where it is read by an optical reader which can for example be a scanning beam and associated photodetector which generates a characteristic signal for each character. Recognition logic circuitry 5 interprets the signal from the optical reader and provides a unique coded output signal on line 18 for each character and a reject signal if the reader is unable to identify the character. Because the distance D between reading stations and the speed at which the document travels are both known, the period of time which it takes the document to travel from magnetic reading station 2 to optical reading station 4 may be ascertained. Adjustable delay network 16 which may comprise a shift register is arranged to delay the signals on line 19 so that the magnetic signal representative of each character arrives at line 17 at approximately the same time that the optical signal representative of the same character arrives at line 18. Because of slight variations in the feed speed of the document and the relative shortness of the coded recognition signals, it is not generally possible for the signals to arrive on lines 17 and 18 at exactly the same instant of time and this is why synchronization logic circuitry 6 is provided. Delay control **16*a*, which may be a clock rate control if the delay network is a shift register, is adjusted so that each recognition signal on line 18 precedes the corresponding recognition signal on line 17 and synchronization logic circuitry 6 holds each signal on line 18 until the instant of time that the corresponding recognition signal on line 17 occurs at which time the logic network 6 feeds out both pulses in synchronism at lines 33 and 34.** While in the illustrated embodiment of the invention the document is read first by the magnetic reader, if desired, it could be read first by the optical reader or under appropriate conditions could be read by the magnetic and optical readers simultaneously.

From synchronization circuitry 6 the optical and magnetic signals are fed on lines 33 and 34 to logic blocks 7 to 12 which are standard logical decision blocks known to those skilled in the art. Logic blocks 7 to 11 are arranged to generate an output signal corresponding to a predetermined one of two input signals and logic block 12 is arranged to make a somewhat more complex decision described in greater detail below. While for the purposes of illustration, logic blocks 7 to 12 have been drawn as separate logic blocks, it should be understood that in an actual embodiment, these blocks could comprise portions of a minicomputer. If desired, the synchronization system shown could be dispensed with and the signals on lines 17 and 18 could be fed directly into the mincomputer which could be designed to correlate each magnetic signal with the corresponding optical signal on a best match basis before the signals are presented to logic blocks 7 to 12.

Logic blocks 7 to 12 generate a final character identification signal on the basis of the optical and magnetic recognition signals fed in on lines 33 and 34 and may be best understood in conjunction with the table shown in FIG. 2. Each of the columns from left to right corresponds to the function performed by each of the logic blocks 7 to 12, respectively. Thus, referring to logic block 7 and the first column, it is seen that when both the optical signal and the magnetic signal are indicative of the same character $A_1$ which they ordinarily will be assuming that there are no defects in the character or character environment, then logic block 7 generates an output identification signal which corresponds to the character $A_1$.

Figure 3:
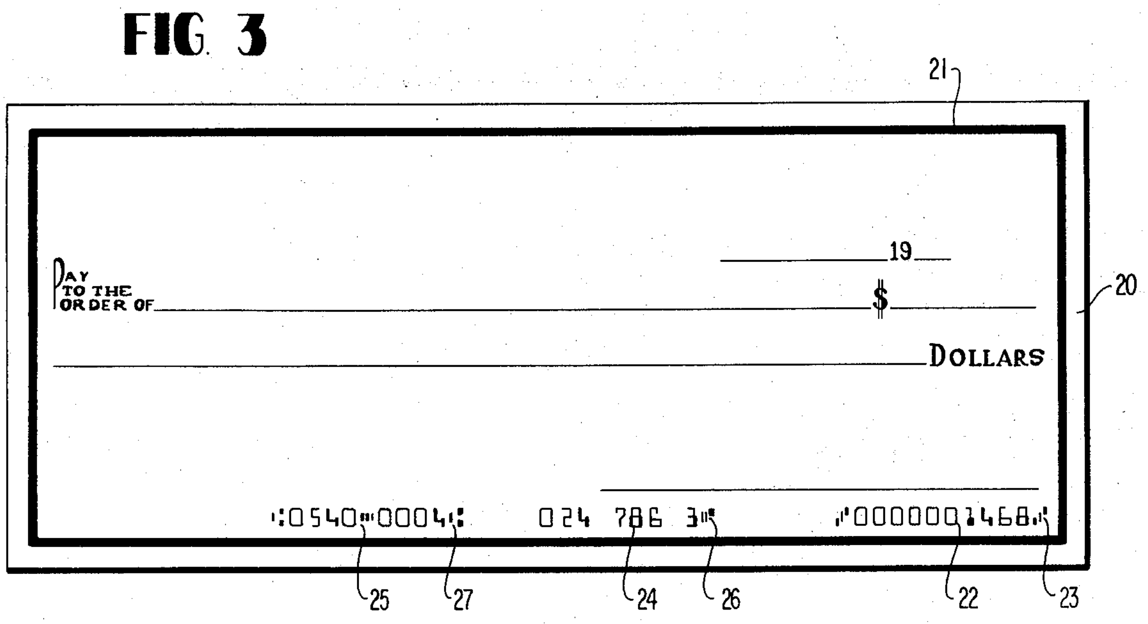
FIG. 3 is an illustration of a typical bank check which may be read by the recognition system shown in FIG. 1.

The situation where the optical reader is unable to recognize a character and produces a reject signal but where the magnetic reader is able to read the character correctly is shown in column 2 and at logic block 8 and in this case the identification signal provided by logic block 8 corresponds to the character recognized by the magnetic reader. There may be a number of reasons why the optical reader will fail to recognize a character while the magnetic reader is successful. One such typical situation arises in reading the amount field of a bank check. A typical bank check is illustrated in FIG. 3 and along its bottom edge are disposed the standard stylized characters which have been adopted by the American Banking Association and which have been designated as the E–13B font. From left to right there is shown transit field 25 which consists of characters representative of the payor bank and the Federal Reserve District with which the payor bank is associated, account field 24 which consists of characters which identify the account number of the drawer of the check and amount field 22 which contains characters indicative of the dollar amount of the check. The transit and account fields are the same for each check distributed to an account holder and are magnetically imprinted on the checks before distribution to the clients of the bank. Amount field 22 on the other hand, is not known until the check is drawn, and is magnetically imprinted on the check by bank personnel after the check is presented to the bank for payment. It frequently occurs that the bank personnel in magnetically imprinting amount field 22 do not position it properly so that check border 22 either obscures or interferes with one or more characters.

An optical reader processing characters which are partially obscured or interfered with by the check border is likely to be unable to recognize the characters and will produce a reject signal. A magnetic reader on the other hand will not "see" the border at all because the border is not printed in magnetic ink and hence will respond only to the characters and will therefore be successful in recognizing the characters. When both an optical reader and magnetic reader are used together as in the present invention, logic block 8 will select the recognition signal of the magnetic reader rather than the reject signal provided by the optical reader and will generate an identification signal on line 8*a* indicative of the character $A_1$ identified by the magnetic reader. Because the obscured character would have been rejected if an optical reader were used by itself, it is seen how using both an optical and magnetic reader together serves to reduce the reject rate.

Column 3 shows the converse of the situation shown in column 2. Here the magnetic reader is unable to recognize a character while the optical reader successfully recognizes the character and logic block 9 generates an identification signal based on the recognition signal provided by the optical reader. This situation, for instance, may occur where a character is somewhat malformed, and where the optical recognition system is capable of identifying the character while the magnetic system is not.

Column 4 and logic block 10 illustrate the situation where the optical signal is a blank or where no signal appears on line 33, but where the magnetic reader provides either a signal indicative of a character or a reject signal. In this situation block 10 provides an identification signal corresponding to the recognition or reject signal provided by the magnetic reader. This situation may occur if the characters are printed in a color to which the frequency of radiation used in the optical system is not responsive. Also in an optical check reading system, the bottom border of the check, as well as the characters, are scanned by the reading system and logic circuitry is provided to remove signals representing the border before the signals are sent to the recognition circuitry. When characters are printed on the border, the circuitry which removes the signals indicative of the border also removes the signals indicative of the characters and a blank signal is sent to recognition.

Column 5 illustrates the converse of the situation shown in column 4. Here, the magnetic reader produces a blank signal while the optical reader produces either a character recognition signal or a reject signal and logic block 11 generates an identification signal corresponding to the recognition or reject signal of the optical reader. This situation may occur in a reading application where some of the characters are not printed in magnetic ink. Hence, it is seen that according to the invention, not only can the reject rate be reduced by recognizing characters which could not heretofore be recognized becuase of defects, but also characters which could not be recognized because they are not susceptible to either optical or magnetic recognition, may be recognized.

In the situation shown in column 6, the optical and magnetic readers provide recognition signals indicative of different characters and hence an ambiguity results. One way to resolve the ambiguity is simply to generate a reject signal each time that it occurs. However, using our knowledge of the various parameters of the particular recognition application, and the relative strengths and weaknesses of the optical and magnetic recognition processes, it is possible to make an intelligent decision and to choose one or the other of the characters identified under certain conditions. Throughout the following discussion, it should be kept in mind that whether a reject is generated in response to the ambiguity or whether a selection between the optical and magnetic recognition signals is made, the parameters which form the basis of the selection and which parameters dominate in any given case are subject to being varied for any given application in a manner within the knowledge of one skilled in the art.

In many documents, characters are located in separate fields and known information about the field in which a character is located may be used as a parameter to determine whether the magnetic or optical signal should be chosen when ambiguous readings occur. The following examples relating to the recognition of characters on checks illustrate how information about the field in which a character is located may be used to effect the recognition process.

Referring to FIG. 3 it is seen that each character field on a check is set off by unique field identification characters shown at 23, 26 and 27. Recognition signals indicative of these field identification characters appear on lines 33 and 34 of FIG. 1 and are fed to logic block 13 which in turn provides a field identification signal to decision block 12 so that block 12 always knows which field the character it is processing is in. Logic block 12 may then generate an output signal corresponding to one of the signals inputted at the bottom of block 12 on lines 33 and 34. When block 12 receives information indicating that the character is in the amount field, because of the possibility of interfering borders and signatures it may be arranged to always generate an output signal corresponding to the character recognized by the magnetic reader which is not sensitive to the nonmagnetic borders or signatures. In the alternative, as discussed above, block 12 may be arranged to emit a reject signal each time ambiguous readings occur in the amount field.

The account field, as is known to those skilled in the art, is a field which checks according to some mathematical scheme such as Luhn's modulus. After all of the characters in the account field have been identified, the entire field is automatically checked, and an erroneous character which has been identified may be discovered. Hence, there is little risk when an ambiguity occurs in choosing one or the other of the optical or magnetic recognition signals and if the amount field does not check then choosing the other signal. Because the optical recognition process may be more reliable than the magnetic process outside of the amount field the optical recognition signal may be chosen first.

When the system has processed the characters in the account field, block 13 provides this information to logic block 12. When an ambiguity occurs, logic block 12 is arranged to first choose the optical signal on line 33 and to generate an identification signal corresponding to the optical signal on line 12*a*. Each of the identification signals in the account field is entered to check logic block 15 where the entire field is checked according to a known mathematical scheme. If the field does not check, a feedback signal on line 15*a* is sent back to blcok 12 and the magnetic signal is then substituted for the optical signal, for the character with respect to which the ambiguity occurred, and the field is checked by block 15 again. If the magnetic signal does not check either, then another feedback signal on line 15*a* may be sent to block 12 causing it to generate a reject signal.

The transit field, depending upon the particular check processing application, may also be checked by logic block 15. For instance, one very common operation performed by banks is the processing of "on us" checks, where each check in the batch being processed is dranwn on the processing bank and where the characters in field 25 are therefore identical for each check. The field is still read, however, to insure that no check from an outside bank has accidentally slipped into the batch being processed. Check logic block 15 has information stored in it relating to the identification number of the bank and compares the identification signals on line 12*a* with the stored signals. As in the case of the account field, the optical signal would be chosen first because of its higher reliability and if it does not agree with the stored information, a feedback signal on line 15*a* will cause block 12 to generate the magnetic signal on line 12*a*. If the magnetic signal does not agree either, then a reject signal may be generated.

Figure 4:
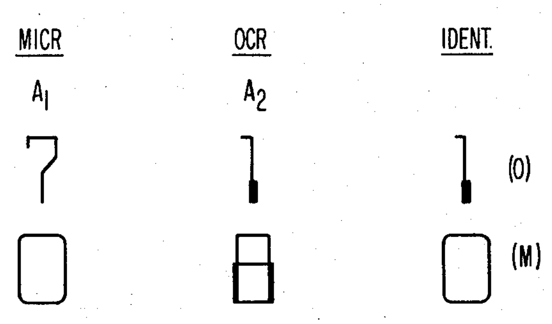
FIG. 4 is an illustration of typical character pairs utilized by the invention.

Another parameter which may be used to determine which of the optical or magnetic signals is chosen when ambiguous readings occur is the unique pair of different characters which are identified by the optical and magnetic readers. It is known that the magnetic recognition system is better at identifying certain characters while the optical recognition system is better at identifying certain other characters and that this is particularly true when certain character pairs are involved. For instance, referring to FIG. 4, it has been determined that a particular optical recognition scheme is capable of differentiating between a one and a seven in E-13B font more effectively than a particular magnetic recognition scheme. Therefore, when the magnetic reader identifies a 7 while the optical reader identifies a 1 for the same character, the optical reader is more likely to be correct and the optical signal may therefore be chosen. On the other hand, when the magnetic reader identifies a zero and the optical reader is actually reading a zero with a horizontal defect across its middle, such as a pen line, and interpreting it as an 8, and in this case the magnetic signal may be chosen. It should be understood that the list of character pairs described herein, is not exhaustive, and that particular character pairs may vary with the particular recognition systems and character fonts which are used.

In FIG. 1 logic block 14 decides whether a character pair has been inputted on lines 33 and 34 and if so provides the appropriate character pair signal to block 12 which chooses either the optical or magnetic signal as discussed above.

It should be appreciated that the system represented by blocks 13, 14, 12 and 15 of FIG. 1 is illustrative only and that the parameters utilized, as well as the decision made by block 12, could be varied by one skilled in the art to suit individual applications. Thus, a reject signal could always be generated when an ambiguity occurs or a decision on the basis of the character field and/or whether or not a character pair exists could be made. Further, when the field parameter indicates that one of the ambiguous signals should be chosen while the character pair parameter indicates that the other should be chosen, one or the other parameters could be made to dominate in different applications.

Figure 5:
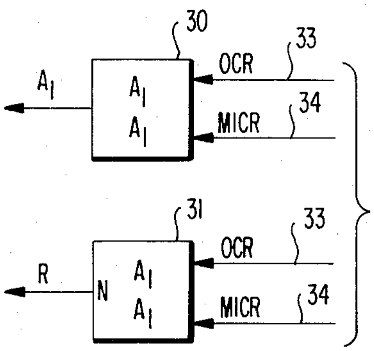
FIG. 5 is a block diagram of a portion of a redundant recognition system according to the invention.

Referring to FIG. 5 a redundant recognition system according to the invention is illustrated. As in FIG. 1, optical and magnetic signals are generated on lines 33 and 34 respectively and are fed to logic blocks 30 and 31. Logic block 30 is identical to logic block 7 in FIG. 1, and is arranged to generate an identification signal corresponding to the character $A_1$ when identical recognition signals indicative of the same character $A_1$ are inputted on lines 33 and 34. Logic block 31 is arranged to generate a reject signal when signals indicative of the same character do not appear on both lines 33 and 34. This would mean that for all of the situations shown in columns 2–6 of the Table of FIG. 2, a reject signal is generated. Because the recognition system of FIG. 5 provides an identification signal only when both the magnetic and optical readers identify the same characters, the system is useful where a relatively high reject rate can be accepted but where an extremely low rate of erroneous character identification is important.

It should be understood that while certain parts of this invention have been illustrated primarily in conjunction with the recognition of characters on checks, that the scope of the invention extends to the recognition of characters in any environment. Further, while the invention has been illustrated in connection with the recognition of E-13B characters, it should be understood that the invention extends to the recognition of characters regardless of font and may, for instance, be used in the recognition of coded characters. It should further be understood that the term character recognition signal, as used in the following claims includes reject and blank recognition signals and the term identification signal includes reject identification signals.

Further, while we have described and illustrated a preferred embodiment of our invention, we wish it to be understood that we do not intend to be restricted solely thereto, but that wo do intend to cover all modifications thereof which would be apparent to one skilled in the art and which come within the spirit and scope of our invention.

I claim:

1. A character recognition system for recognizing characters, at least some of which are printed in magnetic ink comprising magnetic character recognition means for providing a first character recognition signal in response to the magnetic properties of each of said characters, optical character recognition means for providing a second character recognition signal in response to the optical properties of each of said characters, and means including means for comparing said first and second recognition signals for providing a final identification signal corresponding to each of said characters.

2. The system of claim 1 wherein said means for comparing includes means for deciding whether said first and second recognition signals for each character are the same.

3. The system of claim 2 wherein said means for providing an identification signal further includes means responsive to said means for deciding, for providing an identification signal corresponding to the same character as each of said recognition signals when said first and second recognition signals are the same.

4. The system of claim 2 wherein said means for providing an identification signal includes means responsive to said means for deciding, for providing a reject identification signal when said first and second recognition signals are not the same.

5. The system of claim 2 further including means for simultaneously supplying said first and second recognition signals to said means for providing an identification signal.

6. The system of claim 5 wherein one of said magnetic and optical character recognition means provides a recognition signal before the other and wherein said means for simultaneously supplying said first and second signals to said means for providing an identification signal comprises means for delaying said recognition signal which is provided before the other.

7. The system of claim 1 wherein said means for providing a final identification signal further includes means responsive to the comparison performed by said means for comparing for determining said final identification signal.

8. The system of claim 7 wherein said means for providing said final identification signal is responsive to at least a preselected parameter of said characters being recognized.

9. The system of claim 8 wherein said characters being recognized are located on a document and said preselected parameter is the position on the document of the character being recognized.

10. The system of claim 9 wherein said characters on said document are disposed in a plurality of character fields and wherein said at least a preselected parameter is the character field in which the character being recognized is disposed.

11. The system of claim 8 wherein said preselected parameter is the unique pair of characters corresponding to said first and second recognition signals.

12. The system of claim 8 wherein said means for determining is responsive to at least a preselected parameter of said characters being recognized.

13. The system of claim 1 wherein said magnetic recognition means includes first transducer means responsive to the magnetic properties of said characters for generating a first transducer signal and said optical recognition means includes second transducer means responsive to the optical properties of said characters for generating a second transducer signal, said first and second transducer means being spaced from each other, said characters to be recognized being disposed on documents, and means for transporting said documents past a location where said first transducer means responds to the magnetic properties of said characters and generates said first transducer signal and past the location where said second transducer means responds to the optical properties of said characters and generates said second transducer signal.

14. The system of claim 13 wherein said means for transporting comprises mechanical transport means, said system further including magnetic tape output means, print list output means and means for inputting said identification signals to said tape means and said list means.

15. A method of character recognition for identifying characters at least some of which are printed in magnetic ink comprising the steps of:

recognizing said characters both magnetically and optically, generating a magnetic recognition signal and an optical recognition signal indicative of each of said characters, deriving from said magnetic and optical signals a final identification signal for each of said characters.

16. The method of claim 15 wherein said step of deriving includes the step of determining whether said optical recognition signal and said magnetic recognition signal for each of said characters is the same.

17. The method of claim 16 wherein said step of deriving further includes the step of generating an identification signal corresponding to the same character as one of said magnetic and optical recognition signals when said one of said signals identifies a character as being a particular one of said characters being recognized while the other of said signals fails to identify the character as being a particular one of said characters being recognized.

18. The method of claim 17 wherein said other of said recognition signals may be a reject signal.

19. The method of claim 17 wherein said step of deriving further includes the step of providing either an identification signal corresponding to the same character as one of said recognition signals or a reject identification signal when said magnetic and optical recognition signals identify a character as being different ones of said characters being recognized.

20. The method of claim 16 wherein one of said magnetic and optical recognition signals is generated before the other, and wherein said one of said signals is delayed so as to be coincident with said other of said signals and wherein said identification signal is derived from said coincident signals.

21. The method of claim 15 wherein said step of deriving includes the step of comparing said magnetic and optical recognition signals.

22. A check reader for reading stylized characters printed in magnetic ink along the bottom edge of checks, comprising magnetic character recognition means for providing a first recognition signal in response to the magnetic properties of each of said characters on said checks, optical character recognition means spaced from said magnetic character recognition means for providing a second recognition signal in response to the optical properties of each of said characters on said checks, means for moving said checks past said magnetic character recognition means and said optical character recognition means, and means including means for comparing said first and second recognition signals for providing a final identification signal corresponding to each of said characters, said magnetic character recognition means including magnetic transducer means, said optical character recognition means including optical transducer means, and mechanical transport means for moving said checks past said magnetic and optical transducer means.

23. A character recognition system for recognizing characters, at least some of which are printed in magnetic ink comprising magnetic transducer means for generating a first signal in response to the magnetic properties of each of said characters, optical transducer means for generating a second signal in response to the optical properties of each of said characters, and means for generating an identification signal corresponding to each of said characters, said means for generating an identification signal including means for comparing said first and second signals and for selecting one of said first and second signals.

24. A character recognition system for recognizing characters, at least some of which are printed in magnetic ink comprising magnetic character recognition means for providing a first character recognition signal in response to the magnetic properties of each of said characters, optical character recognition means for providing a second character recognition signal in response to the optical properties of each of said characters, and means responsive to said first and second recognition signals for providing a final identification signal indicative of each of said characters, said means for providing a final identification signal including means for providing an identification signal corresponding to the same character as the character that each of said recognition signals corresponds to when said first and second recognition signals are the same.

25. The system of claim 24 wherein said magnetic recognition means includes first transducer means responsive to the magnetic properties of said characters for generating a first transducer signal and said optical recognition means includes second transducer means responsive to the optical properties of said characters for generating a second transducer signal, said first and second transducer means being spaced from each other, said characters to be recognized being disposed on documents, and means for transporting said documents past a location where said first transducer means responds to the magnetic properties of said characters and generates said first transducer signal and past the location where said second transducer means responds to the optical properties of said characters and generates said second transducer signal.

26. The system of claim 25 wherein said means for transporting is a mechanical transport means, said system further including magentic tape output means, print list output means and means for inputting said identification signals indicative of each of said characters to said tape means and said list means.

27. A character recognition system for recognizing characters, at least some of which are printed in magnetic ink comprising magnetic character recogniztion means for providing a first character recognition signal in response to the magnetic properties of each of said characters, optical character recognition means for providing a second character recognition signal in response to the optical properties of each of said characters, and means responsive to said first and second recognition signals for providing a final identification signal indicative of each of said characters, said means for providing a final identification signal including means for selecting one of said first and second signals when said first and second signals are different and for providing an identification signal corresponding to said selected signal.

28. The system of claim 27 wherein said means for selecting includes means for selecting the recognition signal which corresponds to one of said characters being recognized when one of said recognition signals corresponds to one of said characters being recognized and the other recognition signal does not.

29. The system of claim 28 wherein said other of said recognition signals may be a reject signal.

30. The system of claim 28 wherein said other of said recognition signals may be a blank.

31. A character recognition system for recognizing characters, at least some of which are printed in magnetic ink comprising magnetic character recognition means for providing a first character recognition signal in response to the magnetic properties of each of said character, optical character recognition means for providing a second character recognition signal in response to the optical properties of each of said characters, and means responsive to said first and second recognition signals for providing a final identification signal indicative of each of said characters, said means for providing a final identification signal including means for providing either an identification signal corresponding to the same character as one of said recognition signals or a reject identification signal when said first and second recognition signals correspond to different ones of said characters being recognized.

32. The system of claim 31 wherein said means for providing either an identification signal or a reject signal includes means responsive to at least a pre-selected parameter of said characters being recognized for determining which one of said recognition signals said identification signal is to correspond to or whether said identification signal is to be a reject signal.

33. The system of claim 32 wherein said characters being recognized are disposed in a plurality of character fields and wherein said at least a pre-selected parameter is the character field in which the character being recognized is disposed.

34. The system of claim 32 wherein said at least a preselected parameter is the unique pair of characters corresponding to said first and second character recognition signals.

* * * * *